United States Patent
Neumann et al.

(10) Patent No.: US 10,601,772 B2
(45) Date of Patent: Mar. 24, 2020

(54) DEVICE AND METHOD FOR FORWARDING CONNECTIONS

(71) Applicant: THOMSON Licensing, Issy-les-Moulineaux (FR)

(72) Inventors: Christoph Neumann, Rennes (FR); Anne Lambert, St Aubin d'Aubigné (FR); Pascal Le Guyadec, Saint Cloud (FR); Thierry Filoche, Saint Aubin du Pavail (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/926,956

(22) Filed: Mar. 20, 2018

(65) Prior Publication Data
US 2018/0278574 A1    Sep. 27, 2018

(51) Int. Cl.
*H04L 12/28* (2006.01)
*H04L 29/12* (2006.01)
(Continued)

(52) U.S. Cl.
CPC ........ *H04L 61/2517* (2013.01); *G06F 21/606* (2013.01); *H04L 61/256* (2013.01);
(Continued)

(58) Field of Classification Search
CPC .......... G06F 21/606; G06F 2221/2133; H04L 61/2514; H04L 61/2517; H04L 61/2557;
(Continued)

(56) References Cited

U.S. PATENT DOCUMENTS

| 6,956,854 B2 | 10/2005 | Ganesh et al. |
| 8,606,898 B1 | 12/2013 | Phatak |

(Continued)

FOREIGN PATENT DOCUMENTS

| EP | 2640008 | 9/2013 |
| GB | 2532452 | 11/2016 |

OTHER PUBLICATIONS

Boman, M., "Securing SSH access with pam captcha", http://www.michaelboman.org/how-to/securing-ssh-access-with-pam-captcha, Sep. 30, 2010, p. 1.
(Continued)

*Primary Examiner* — Minh Trang T Nguyen
(74) *Attorney, Agent, or Firm* — Patricia A. Verlangieri

(57) ABSTRACT

A method for forwarding a connection at an interconnecting device is described. The method includes receiving from an originating device an incoming connection at an incoming port, determining by at least one hardware processor whether port translation is implemented for the incoming port, in case port translation is implemented for the incoming port, returning to the originating device by the at least one hardware processor a challenge intended to distinguish humans from computers, verifying by the at least one hardware processor that a response received in response to the challenge is a correct response to the challenge, and, in case the response is a correct response to the challenge, forwarding, by the at least one hardware processor, the connection to a translated port corresponding to the incoming port according to the port translation.

14 Claims, 3 Drawing Sheets

(51) Int. Cl.
*H04L 29/06* (2006.01)
*G06F 21/60* (2013.01)
*H04L 29/08* (2006.01)

(52) U.S. Cl.
CPC ...... *H04L 61/2514* (2013.01); *H04L 61/2557* (2013.01); *H04L 63/02* (2013.01); *H04L 63/08* (2013.01); *H04L 67/125* (2013.01); *G06F 2221/2133* (2013.01); *H04L 63/1458* (2013.01)

(58) Field of Classification Search
CPC ....... H04L 61/256; H04L 63/02; H04L 63/08; H04L 63/1458; H04L 67/125
See application file for complete search history.

(56) References Cited

U.S. PATENT DOCUMENTS

| | | | |
|---|---|---|---|
| 2004/0218614 A1 | 11/2004 | Yokomitsu et al. | |
| 2005/0078704 A1* | 4/2005 | Anderson | H04L 69/22 370/466 |
| 2006/0047766 A1* | 3/2006 | Spadea, III | H04L 51/12 709/206 |
| 2007/0026372 A1* | 2/2007 | Huelsbergen | G09B 3/00 434/322 |
| 2007/0266426 A1 | 11/2007 | Iyengar et al. | |
| 2010/0095350 A1* | 4/2010 | Lazar | G06F 21/36 726/3 |
| 2010/0229223 A1* | 9/2010 | Shepard | G06F 21/31 726/5 |
| 2011/0150267 A1* | 6/2011 | Snelling | G06F 21/316 382/100 |
| 2011/0209076 A1* | 8/2011 | Saxena | G06F 21/36 715/764 |
| 2015/0180829 A1 | 6/2015 | Yu | |
| 2016/0173527 A1 | 6/2016 | Kasman et al. | |
| 2016/0315929 A1 | 10/2016 | Childress et al. | |

OTHER PUBLICATIONS

Costin et al., "A Large-Scale Analysis of the Security of Embedded Firmwares", 23rd USENIX Security Symposium (USENIX Security 14), San Diego, California, USA, Aug. 20, 2014, pp. 95-110.
Costin et al., "Automated Dynamic Firmware Analysis at Scale: A Case Study on Embedded Web Interfaces", Proceedings of the 11th ACM on Asia Conference on Computer and Communications Security, Xi'an, China, May 30, 2016, pp. 1-16.
Greene, T., "Largest DDoS attack ever delivered by botnet of hijacked IoT devices", Network World, http://www.networkworld.com/article/3123672/security/largest-ddos-attach-ever-deli . . . , Sep. 23, 2016, pp. 1-4.

* cited by examiner

DEVICE AND METHOD FOR FORWARDING CONNECTIONS

REFERENCE RELATED TO EUROPEAN APPLICATION

This application claims priority from European Patent Application No. 17305314.1, entitled "DEVICE AND METHOD FOR FORWARDING CONNECTIONS", filed on Mar. 21, 2017, the contents of which are hereby incorporated by reference in its entirety.

TECHNICAL FIELD

The present disclosure relates generally to network security and in particular to protection of devices accessible via port forwarding.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The Internet of Things (IoT) is made up of connected embedded systems, that often are small and specialised, such as different kinds of sensors. The IoT is currently growing rapidly. According to "The Internet of Things—How the Next Evolution of the Internet Is Changing Everything" by Dave Evans published in April 2011, Cisco estimated the number of IoT devices in 2020 to 50 billion.

IoT devices embed firmware or an operating system (OS). For various reasons, IoT devices tend to be unmaintained which can mean that they implement old software versions and/or are poorly protected—see Andrei Costin et al. "A Large-Scale Analysis of the Security of Embedded Firmware" 23$^{rd}$ USENIX Security Symposium, 2014. As a result, IoT devices can suffer from a large number of vulnerabilities—see Andrei Costin et al. "Automated Dynamic Firmware Analysis at Scale: A Case Study on Embedded Web Interfaces" Proceedings of the 11$^{th}$ ACM on Asia Conference on Computer and Communications Security, 2016.

Given the large and increasing number of IoT devices, the vulnerabilities pose a significant security problem: attackers can exploit them to take control over a large number of IoT devices and use these for different attacks, for example Denial of Service (DoS) attacks. The larger the number of IoT devices that are deployed, the bigger the problem can get, but even currently deployed IoT devices are sufficient to be used by Botnets to launch a large-scale DoS attack, according to Tim Greene in "Largest DDoS attack ever delivered by botnet of hijacked IoT devices" published in Network World on Sep. 23, 2016.

One reason underlying the possibility to take control of IoT devices is that these often require their services to be remotely accessible over the Internet to enable legitimate users to use services provided by the device. An example is an IoT camera with an embedded webserver that provides access to the video stream.

A common conventional way of enabling remote access is to combine Dynamic DNS (DDNS) and port forwarding. In DDNS, the domain name used to access the IoT device leads to a (potentially changing) Internet Protocol address of a connecting device, for example a gateway, that provides access to the IoT device. Port forwarding maps a specific port on the external side of the connecting device to a specific port on its internal side. A connection to the IoT device thus goes to the external port where it is translated to the internal port to which the IoT device is connected.

It will be appreciated that using DDNS and port forwarding leaves the IoT devices exposed to the Internet and hence to possible attacks. Indeed, attackers can use robots to search for IoT devices and then exploit a known vulnerability to take control of the IoT device. In some cases, the vulnerability can be as simple as the continued use of default login and password, for example "admin" and "admin". As attacks using robots can be automated, it can be possible for attackers to take control of a large number (possibly millions) of IoT devices.

It will be appreciated that it is desired to have a solution that overcomes at least part of the conventional problems related to protection of IoT devices accessible through a gateway using port forwarding. The present principles provide such a solution.

SUMMARY OF DISCLOSURE

In a first aspect, the present principles are directed to an interconnecting device comprising: a plurality of outgoing ports, a plurality of incoming ports, memory configured to store at least one port translation from an incoming port to an outgoing port, and at least one hardware processor configured to determine whether an incoming connection from an originating device was received at an incoming port for which the memory stores a port translation, in case the incoming connection was received at an incoming port for which the memory stores a port translation, return a challenge to the originating device, the challenge intended to distinguish humans from computers, receive a response to the challenge, verify that the response is a correct response to the challenge, in case the response is a correct response to the challenge, forward the connection to an outgoing port corresponding, according to the port translation, to the incoming port at which the incoming connection was received.

Various embodiments of the first aspect include:

That the plurality of outgoing ports comprises a first port configured for connection to a first device. The challenge can be of one of a plurality of types of challenges and the at least one hardware processor can be further configured to determine a type of service running on the first port and to determine the type of challenge in dependence on the type of service. The challenge can be a Completely Automated Public Turing test to tell Computers and Humans Apart (CAPTCHA), in particular web CAPTCHA and text CAPTCHA.

That, in case the incoming connection is a HyperText Transfer Protocol (HTTP) connection, the at least one hardware processor is configured to return the challenge by presenting a captive web portal with a web Completely Automated Public Turing test to tell Computers and Humans Apart (CAPTCHA), and to forward the connection using a HTTP redirect.

That, in case the incoming connection is a Secure Socket Layer (SSL) or Telnet connection, the at least one hardware processor is configured to return the challenge by presenting a captive terminal with a text Completely Automated Public Turing test to tell Computers and Humans Apart (CAPTCHA), and to forward the connection by terminating the connection and forwarding a further connection from the originating device.

That the at least one hardware processor upon reception of a correct response to the challenge is further configured to initiate a state such that subsequent connections from the originating device are forwarded without returning a challenge.

In a second aspect, the present principles are directed to a method at an interconnecting device. An incoming port receives an incoming connection from an originating device, at least one hardware processor determines whether port translation is implemented for the incoming port. In case port translation is implemented for the incoming port, the at least one hardware processor returns to the originating device a challenge intended to distinguish humans from computers. The at least one hardware processor verifies that a response received in response to the challenge is a correct response to the challenge and, in case the response is a correct response to the challenge, forwards the connection to an outgoing port corresponding, according to the port translation, to the incoming port at which the incoming connection was received.

Various embodiments of the second aspect include:

That the challenge is of one of a plurality of types of challenges and that the method further comprises determining a type of service running on the translated port and determining the type of challenge in dependence on the type of service.

That, in case the incoming connection is a HyperText Transfer Protocol (HTTP) connection, the at least one hardware processor returns the challenge by presenting a captive web portal with a web Completely Automated Public Turing test to tell Computers and Humans Apart (CAPTCHA), and forwards the connection using a HTTP redirect.

That, in case the incoming connection is a Secure Socket Layer (SSL) or Telnet connection, the at least one hardware processor returns the challenge by presenting a captive terminal with a text Completely Automated Public Turing test to tell Computers and Humans Apart (CAPTCHA), and forwards the connection by terminating the connection and forwarding a further connection from the originating device.

That, upon reception of a correct response to the challenge, the at least one hardware processor initiates a state such that subsequent connections from the originating device are forwarded without returning a challenge.

In a third aspect, the present principles are directed to a computer-readable storage medium comprising instructions which, when executed by a computer, cause the computer to carry out the steps of the method of the second aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
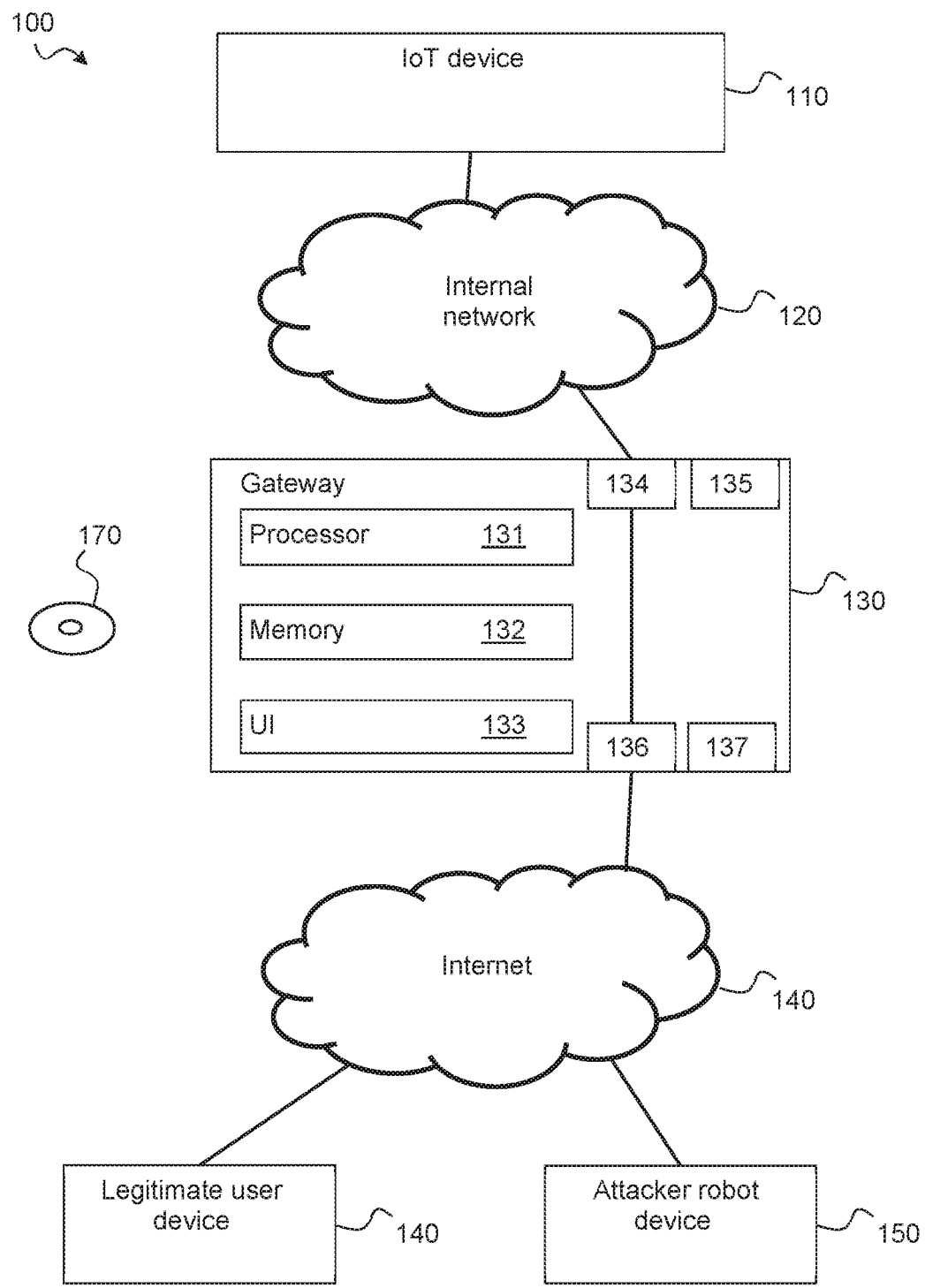
FIG. 1 illustrates an exemplary network according to an embodiment of the present principles.

FIG. 1 illustrates an exemplary network 100 according to an embodiment of the present principles. The network 100 comprises an IoT device 110 connected through an internal network 120 to a first port 134 of an interconnecting device 130 that in a non-limiting example is a gateway. The internal network 120 can be wired or wireless.

The interconnecting device 130 includes at least one hardware processing unit ("processor") 131, memory 132, and possibly a user interface (UI) 133. The memory 132 is configured to store the instructions for execution by the processor 131. The interconnecting device 130 further includes a second port 135 connected to the internal network 120 and a third port 136 and a fourth port 137 connected to the Internet 140.

A user device 150 of a legitimate user—for example the owner of the IoT device 110—and an attacker device 160—for example a robot—are configured to connect to the interconnected device 130 via the Internet 140. As already explained, the user device 150 can be used by a user to connect to the IoT device 110 in a legitimate manner. In addition, the attacker device 160 can be used by an attacker to try to gain control of the IoT device 110.

The processor 131 is configured to implement port forwarding to translate a port to the Internet 140 to a port to the internal network 120. The port forwarding can for instance be configured by a user via the user interface 133. For example, to connect to the IoT device 110, user device 150 sends a message to the current IP address of the interconnecting device 130 and the port 136 associated with the IoT device 110. The processor 131 then translates the port 136 in the message to a port on the internal network 120, for example using a look-up table (possibly stored in the memory 132) or a rule-based computation to do so. The message is then output on the translated port, in this case port 134, for delivery to the IoT device. The port translation can be performed in the opposite direction, too.

Non-transitory storage media 170 stores instructions that, when executed by a processor, perform functions of the processor 131 to protect the IoT device as further described hereinafter. The storage media 170, which can be located in a remote location, can be connected, directly or indirectly, to the interconnecting device 130 in order to download the instructions.

The skilled person will appreciate that the illustrated interconnecting device is very simplified for reasons of succinctness and that for example a real gateway in addition would comprise features such as internal connections and power supplies.

Figure 2:
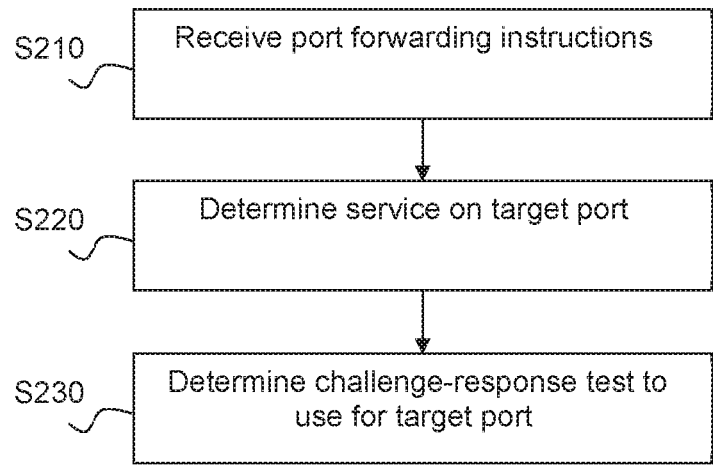
FIG. 2 illustrates a method for protecting IoT devices according to an embodiment of the present principles.

FIG. 2 illustrates a method for protecting IoT devices according to an embodiment of the present principles.

In step S210, the interconnecting device 130 receives port forwarding instructions through the user interface 133; for example, "forward external port X to internal port Y". The port translation can for example be stored by the processor 131 in the memory 132.

In step S220, the processor 131 determines the type of service—e.g. Hypertext Transfer Protocol (HTTP), HTTPS, Telnet or Secure Shell (SSH)—running on the target port, i.e. the external port, of the interconnecting device 130. To do so, the processor can for example perform one or if necessary more of the following:

determine if the target port is a well known port conventionally used for a specific purpose, such as port 80 used for Transmission Control Protocol, port 443 used for HTTPS, and port 22 used for SSH.

initiate a scan of the IoT device on its internal port to discover the service. This can for example be done using the nmap (network mapper) program.

use Telnet to connect to the IoT device on the internal port and retrieve the header in a response. This header is likely to reveal the type of service.

In step S230, the processor 131 uses the knowledge of the service to determine the type of challenge-response test to use to try to distinguish humans from robots when receiving incoming connections to the external port. A very common challenge-response test is Completely Automated Public Turing test to tell Computers and Humans Apart (CAPTCHA) that exists in at least two versions, web CAPTCHA and text CAPTCHA.

Figures 4, 5:
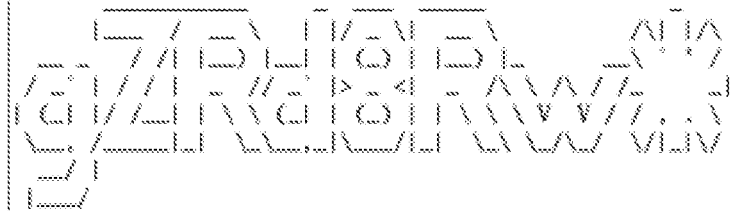
FIG. 4 illustrates examples of web CAPTCHA.
FIG. 5 illustrates an example of text CAPTCHA.

Non-limitative examples of web CAPTCHA are illustrated in FIG. 4.

A non-limitative example of text CAPTCHA is illustrated in FIG. 5.

In the example shown in FIG. 5, the string "gZRd8Rw*" is the response input by a user.

In case the processor 131 cannot determine the type of service, it may use the UI 132 to ask the user to specify the service; available options can be provided through the UI.

It is noted that the processor 131 may also decide not to implement any challenge-response test for connections to the external port. This may for example be the case if the IoT device implements a secure connection mechanism and should be accessible by devices without user intervention.

Figure 3:
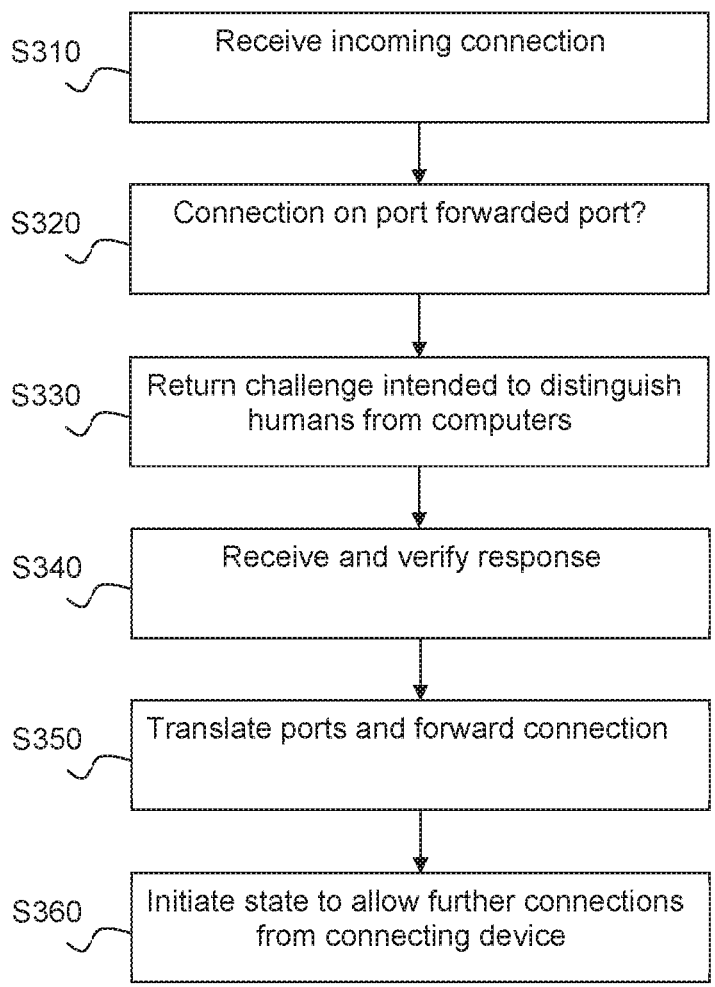
FIG. 3 illustrates a connection method according to an embodiment of the present principles.

FIG. 3 illustrates a connection method at an interconnecting device according to an embodiment of the present principles.

In step S310, the interconnecting device 130 receives an incoming connection from a connecting device 150, 160 on one of the incoming ports 136, 137 reachable through the Internet 140.

In step S320, the processor 131 determines if the connection is on an incoming port for which port forwarding is configured, for example port 136. In case port forwarding is not configured for the port, which for example is the case for port 137, or in case the processor 131 has determined (see step S230) that no challenge-response test is to be used, then the connection is handled in the conventional way.

However, in case port forwarding is implemented for the incoming port and a challenge-response test intended to distinguish humans from computers is to be used, then in step S330, the processor 131 returns a challenge of the challenge-response test to the connecting device 150, 160 and waits for a response.

In step S340, the processor 131 receives and verifies a response. In case the response is incorrect, then the processor 131 aborts the connection. The processor 131 also aborts the connection in case no response is before a timer times out.

On the other hand, in case the response is correct, then in step S350, the processor 131 translates the incoming port used in the connection to the corresponding outgoing port on the internal network 120, for example port 135, and forwards the connection to the IoT device 110. It will be appreciated that the translation and the forwarding can be done in any conventional manner.

How steps S330, S340 and S350 are implemented can depend on the services and protocols used. For example, in case of HTTP/web connections, a gateway can present a captive web portal with a web CAPTCHA, and continue with a HTTP redirect when the CAPTCHA has been correctly solved.

As another example, in case SSH or Telnet is used, the gateway can store the IP address of the connecting device, present a captive terminal with a text CAPTCHA and, once the CAPTCHA has been correctly solved, terminate the connection, which requires the client to initiate a new connection. If the new connection comes from the stored IP address, then the gateway can forward the new connection to the IoT device directly.

In optional step S360, the processor 131 initiates a state such that at a subsequent connection from the connecting device, no challenge need be solved. This can be achieved through the use of HTTP cookies or by storing the IP address of the connecting host.

In a variant of the present principles, the processor 131 makes use of the certificate(s) of the IoT device 110. To do so, the processor 131 uses a fingerprinting tool, such as nmap, or similar to determine the type of firmware or OS used by the IoT device 110. Depending on the determined type of firmware or OS, the processor 131 can contact a server or repository with known private keys/certificates; an example server is located at http://www.firmware.re/keys-n-pass/. The processor 131 can then retrieve one or more private key and certificate pairs that are relevant for the detected firmware or OS and use these credentials when presenting the challenge to the connecting device.

It will be appreciated that the variant can avoid that the connecting device reports an SSL/HTTPS warning when terminating its connection on the gateway instead of the IoT device (in order to receive the CAPTCHA).

As will be appreciated, the present principles can enable improved protection of devices such as IoT devices that should be accessible via an interconnecting device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. An interconnecting device, comprising:
a plurality of outgoing ports;
a plurality of incoming ports;
memory configured to store at least one port translation from an incoming port to an outgoing port; and
at least one hardware processor configured to:
determine whether an incoming connection from an originating device was received at an incoming port for which the memory stores a port translation;
in case the incoming connection was received at an incoming port for which the memory stores a port translation, return a challenge to the originating device, the challenge intended to distinguish humans from computers;
receive a response to the challenge;
verify that the response is a correct response to the challenge; and
in case the response is a correct response to the challenge, forward the connection to an outgoing port corresponding, according to the port translation, to the incoming port at which the incoming connection was received.

2. The interconnecting device of claim 1, wherein the plurality of outgoing ports comprises a first port configured for connection to a first device.

3. The interconnecting device of claim 2, wherein the challenge is of one of a plurality of types of challenges and wherein the at least one hardware processor is further configured to determine a type of service running on the first port and to determine the type of challenge in dependence on the type of service.

4. The interconnecting device of claim 3, wherein the challenge is a Completely Automated Public Turing test to tell Computers and Humans Apart (CAPTCHA).

5. The interconnecting device of claim 4, wherein types of challenge comprise web CAPTCHA and text CAPTCHA.

6. The interconnecting device of claim 1, wherein, in case the incoming connection is a HyperText Transfer Protocol (HTTP) connection, the at least one hardware processor is configured to return the challenge by presenting a captive web portal with a web Completely Automated Public Turing test to tell Computers and Humans Apart (CAPTCHA), and to forward the connection using a HTTP redirect.

7. The interconnecting device of claim 1, wherein, in case the incoming connection is a Secure Socket Layer (SSL) or Telnet connection, the at least one hardware processor is configured to return the challenge by presenting a captive terminal with a text Completely Automated Public Turing test to tell Computers and Humans Apart (CAPTCHA), and to forward the connection by terminating the connection and forwarding a further connection from the originating device.

8. The interconnecting device of claim 1, wherein the at least one hardware processor upon reception of a correct response to the challenge is further configured to initiate a state such that subsequent connections from the originating device are forwarded without returning a challenge.

9. A method at an interconnecting device comprising:
receiving from an originating device an incoming connection at an incoming port;
determining by at least one hardware processor whether port translation is implemented for the incoming port;
in case port translation is implemented for the incoming port, returning to the originating device by the at least one hardware processor a challenge intended to distinguish humans from computers;
verifying by the at least one hardware processor that a response received in response to the challenge is a correct response to the challenge; and
in case the response is a correct response to the challenge, forwarding, by the at least one hardware processor, the connection to an outgoing port corresponding, according to the port translation, to the incoming port at which the incoming connection was received.

10. The method of claim 9, wherein the challenge is of one of a plurality of types of challenges and wherein the method further comprises determining a type of service running on the translated port and determining the type of challenge in dependence on the type of service.

11. The method of claim 9, wherein, in case the incoming connection is a HyperText Transfer Protocol (HTTP) connection, the at least one hardware processor returns the challenge by presenting a captive web portal with a web Completely Automated Public Turing test to tell Computers and Humans Apart (CAPTCHA), and forwards the connection using a HTTP redirect.

12. The method of claim 9, wherein, in case the incoming connection is a Secure Socket Layer (SSL) or Telnet connection, the at least one hardware processor returns the challenge by presenting a captive terminal with a text Completely Automated Public Turing test to tell Computers and Humans Apart (CAPTCHA), and forwards the connection by terminating the connection and forwarding a further connection from the originating device.

13. The method of claim 9, further comprising, upon reception of a correct response to the challenge, initiating, by the at least one hardware processor, a state such that subsequent connections from the originating device are forwarded without returning a challenge.

14. A non-transitory computer-readable storage medium comprising instructions which, when executed by a computer, cause the computer to carry out the steps of the method of claim 9.

* * * * *